(12) United States Patent
Robinson et al.

(10) Patent No.: US 6,647,323 B1
(45) Date of Patent: Nov. 11, 2003

(54) VEHICLE COMMUNICATION LINK AUTOMATIC DIAGNOSTIC TOOL DETECTION

(75) Inventors: Timothy Alan Robinson, Avon, IN (US); James H Stewart, Guflport, MS (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/578,207

(22) Filed: May 24, 2000

(51) Int. Cl.[7] .................................................. G06F 7/00
(52) U.S. Cl. .......................................................... 701/1
(58) Field of Search ................................. 701/1, 23–24, 701/30–35, 36, 39, 43, 92, 97, 107; 702/182–185; 340/286.01, 286.02, 292; 714/100, 25–27, 30–31, 39–44, 46–52; 370/241–242

(56) References Cited

U.S. PATENT DOCUMENTS

| | | | | |
|---|---|---|---|---|
| 4,937,825 A | * | 6/1990 | Ballard et al. | 714/712 |
| 5,856,976 A | * | 1/1999 | Hirano | 370/401 |
| 5,894,478 A | * | 4/1999 | Barzegar et al. | 370/401 |
| 5,950,149 A | * | 9/1999 | Fieramosca et al. | 702/183 |
| 6,230,089 B1 | * | 5/2001 | Lonn et al. | 701/48 |
| 6,236,917 B1 | * | 5/2001 | Liebl et al. | 701/29 |

* cited by examiner

*Primary Examiner*—Thu Nguyen
(74) *Attorney, Agent, or Firm*—Christopher DeVries

(57) ABSTRACT

A method and apparatus to allow a vehicle controller, via a vehicle network, to automatically detect a diagnostic tool and reconfigure to communicate with the diagnostic tool.

4 Claims, 5 Drawing Sheets

VEHICLE COMMUNICATION LINK AUTOMATIC DIAGNOSTIC TOOL DETECTION

TECHNICAL FIELD

The present invention relates to on-board vehicle controllers. More specifically, the present invention relates to an on-board vehicle control method and apparatus that is able to detect electronic devices such as remote development, diagnostic and software tools on a vehicle network.

BACKGROUND OF THE INVENTION

An area in the auto industry seeing tremendous change from past practices is the area of control and communication in vehicles. The creation of relatively inexpensive microprocessors and the digital revolution have put the power of advanced electronics and communication into the hands of vehicle engineers. Controllers, microprocessors and other electronic devices control and monitor various systems in a vehicle such as the transmission, the internal combustion engine, braking systems, and other related systems. The information stored on the controllers in the vehicle must be accessed by remote electronic devices such as development, diagnostic, and software tools ("tools") during testing and programming. The tools are used to monitor and modify vehicle process variables and other vehicle data during testing and maintenance activities. The vehicle process variables and data indicate if the on-board electronic systems of the vehicle are functioning correctly and also control certain vehicle functions.

Vehicle controllers storing various vehicle process variables and data may be required to interface with a myriad of tools having numerous communication protocols. The communication protocols may vary from tool to tool as a function of manufacturer, and vehicle controller to vehicle controller as a function of vehicle makes, models, or model years. Conventional vehicle controllers have limited communication flexibility and are only capable of communicating with a limited amount of tools under a specific communication protocol. In some cases, a vehicle controller must be manually configured to communicate with a specific diagnostic tool or vice-versa. Diagnostic test time and expense increase significantly when a vehicle controller and/or diagnostic tool are manually reconfigured to communicate.

Accordingly, because of the limited flexibility of present day diagnostic tools and vehicle controllers, it would be desirable to provide a vehicle controller that can detect a diagnostic tool and automatically reconfigure for communication with that diagnostic tool.

SUMMARY OF THE INVENTION

In accordance with the present invention, an on-board vehicle controller is automatically configurable for one or more diagnostic tools, using only one set of diagnostic tool processing routines or software. The method and apparatus of the present invention provide a means to detect the type of diagnostic tool that is requesting information from the vehicle controller and configuring the vehicle controller to communicate with the diagnostic tool. After the controller has detected the diagnostic tool, the controller formats requests from each specific diagnostic tool, having a specific communication link and tool format, to a general format for processing. After a tool request is processed, the response is formatted into the form required by the requesting tool. A default communication link/tool is predefined and the software resets the diagnostic tool type back to the default configuration after a variable calibration time period has elapsed since the first request was received from the non-default tool. After the variable calibration time-out period has elapsed, any tool recognized by the software can then be reconnected and automatically identified.

The present invention reduces the amount of vehicle controller memory resources that are required to support additional diagnostic tool interfaces. For example, one set of general diagnostic tool request processing software or algorithms can be used to support more than one type of vehicle communication link/network and diagnostic tool, with approximately the same amount of memory usage. This gives vehicle controllers with limited memory resources the ability to support multiple diagnostic tools. In addition, use of this invention substantially improves controller software maintainability by eliminating redundant communication software for multiple communication protocols.

The on-board vehicle controller of the present invention provides a dynamic method and apparatus to detect and communicate with multiple tools that are attached and detached to a vehicle communication network. The vehicle controller includes communication specific hardware and software that are able to receive and transmit information over a plurality of standard communication protocols such as IES-CAN, GMLAN, KWP2000, J1850, and J1939. The communication link specific software is contained in a first datalink/network layer that interfaces to a second applications layer which is functionally independent of the communication protocol. The vehicle controller software is capable of interfacing with remote development, diagnostic, and software tools having multiple communication protocols.

The vehicle controller of the present invention monitors a vehicle communication network for messages or requests by diagnostic tools for vehicle data. The vehicle controller includes communication link/interface receive buffers for the communication networks linked to the vehicle controller to determine if diagnostic tools are present on the communication network. Every message from a diagnostic tool includes an identifier which defines the message priority, the address of the diagnostic tool that sent the message, and information describing the requested data. The vehicle controller detects the message, via the receive buffers, and stores the ID or address of the tool and then transmits the requested vehicle data to the diagnostic tool. Thus, the vehicle controller of the present invention has a "plug and play" configuration. The diagnostic tool is plugged into the vehicle communication network, the vehicle controller detects the diagnostic tool, and the vehicle controller transmits data requested by the diagnostic tool without manual intervention.

BRIEF DESCRIPTION OF THE DRAWINGS

The various advantages of the present invention will become apparent to one skilled in the art upon reading the following specification and by reference to the drawings in which.

DESCRIPTION OF THE PREFERRED EMBODIMENT

Figure 1:
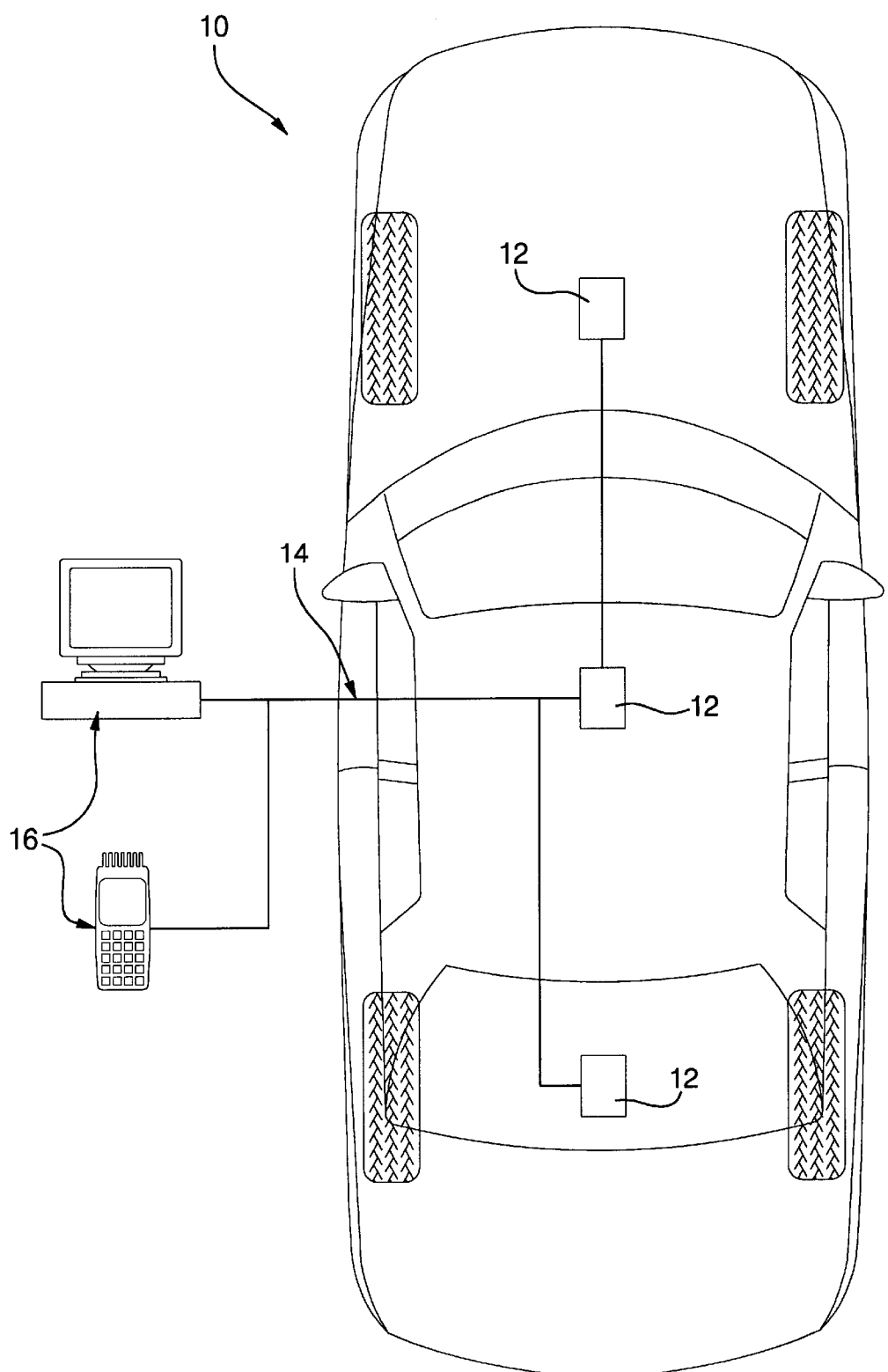
FIG. 1 is a diagrammatic drawing of a vehicle incorporating the vehicle controller of the present invention.

Referring to FIG. 1, a vehicle 10 is shown including a plurality of on-board vehicle controllers 12. The term "on-board" is defined as being located in a substantially permanent manner on or within the vehicle 10. The vehicle controllers 12 may include engine control modules, transmission control modules, brake system control modules, instrument control modules, and any other on-board vehicle controller. The vehicle controllers 12 communicate via a vehicle communication network 14. The communication network 14 may comprise any known vehicle communication system such as IES-CAN, GMLAN, KWP2000, J1850, CCD, or J1939, but is not limited to such. Remote development, diagnostic, and other software tools 16 may interface with the communication network 14 to access vehicle process variables and data in the memory of the vehicle controllers 12. The variables and data are used by the tools 16 to test the vehicle 10 electronic systems, diagnose problems, and/or adjust vehicle parameters and calibration.

Figure 2:
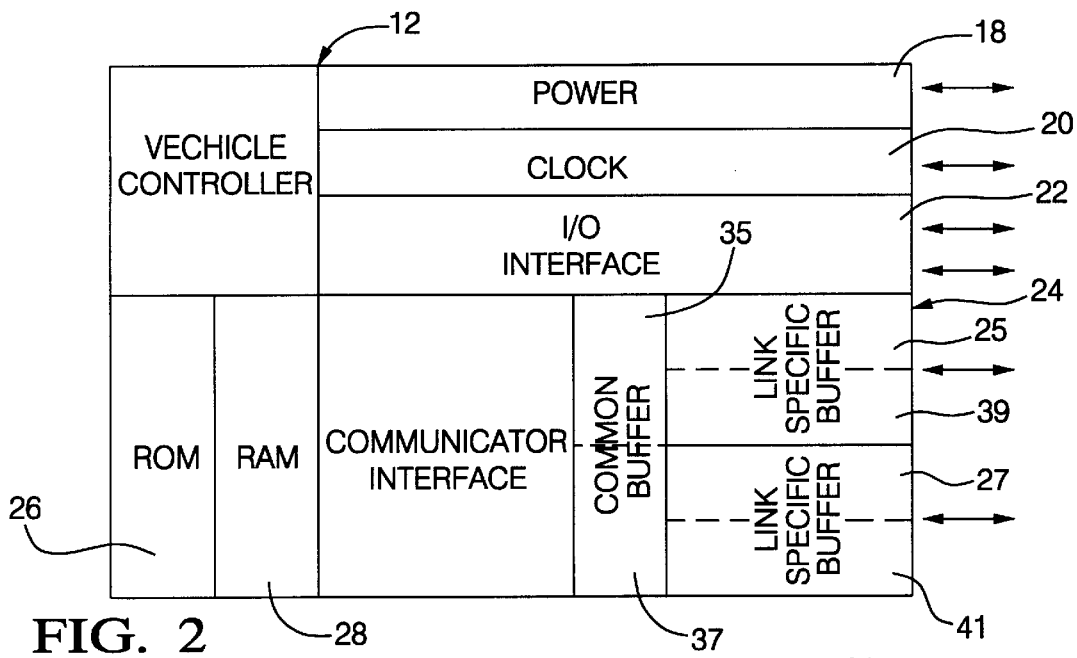
FIG. 2 is a block diagram of a vehicle controller.

FIG. 2 is a block diagram of the vehicle controller 12 used in the present invention. The vehicle controller 12 includes a power interface 18, clock input 20, an input/output interface 22 having analog and digital capabilities, and a communication interface 24 to transfer data over the communication protocols/networks previously described in this application. The communication interface 24 includes communication link/interface specific receive buffers 25 and 27 and transmit buffers 39 and 41 for at least two vehicle communication networks linked to the vehicle controller. Common receive and transmit buffers 35 and 37 are in communication with the receive buffers 25 and 27 and the transmit buffers 39 and 41. The receive buffers 25 and 27 store incoming messages from a vehicle communication network such as communication network 14. The vehicle controller 12 in the preferred embodiment may communicate, via the communication interface 24, over multiple vehicle communication networks simultaneously to transfer data to multiple tools.

The vehicle controller 12 further includes ROM 26 and RAM 28. The ROM 26 includes the basic operating system of the vehicle controller 12 and any other data and parameters which generally require permanent storage in the vehicle controller 12. The function of the RAM 28 includes the manipulation and storage of vehicle process variables and other vehicle data.

Figure 3:
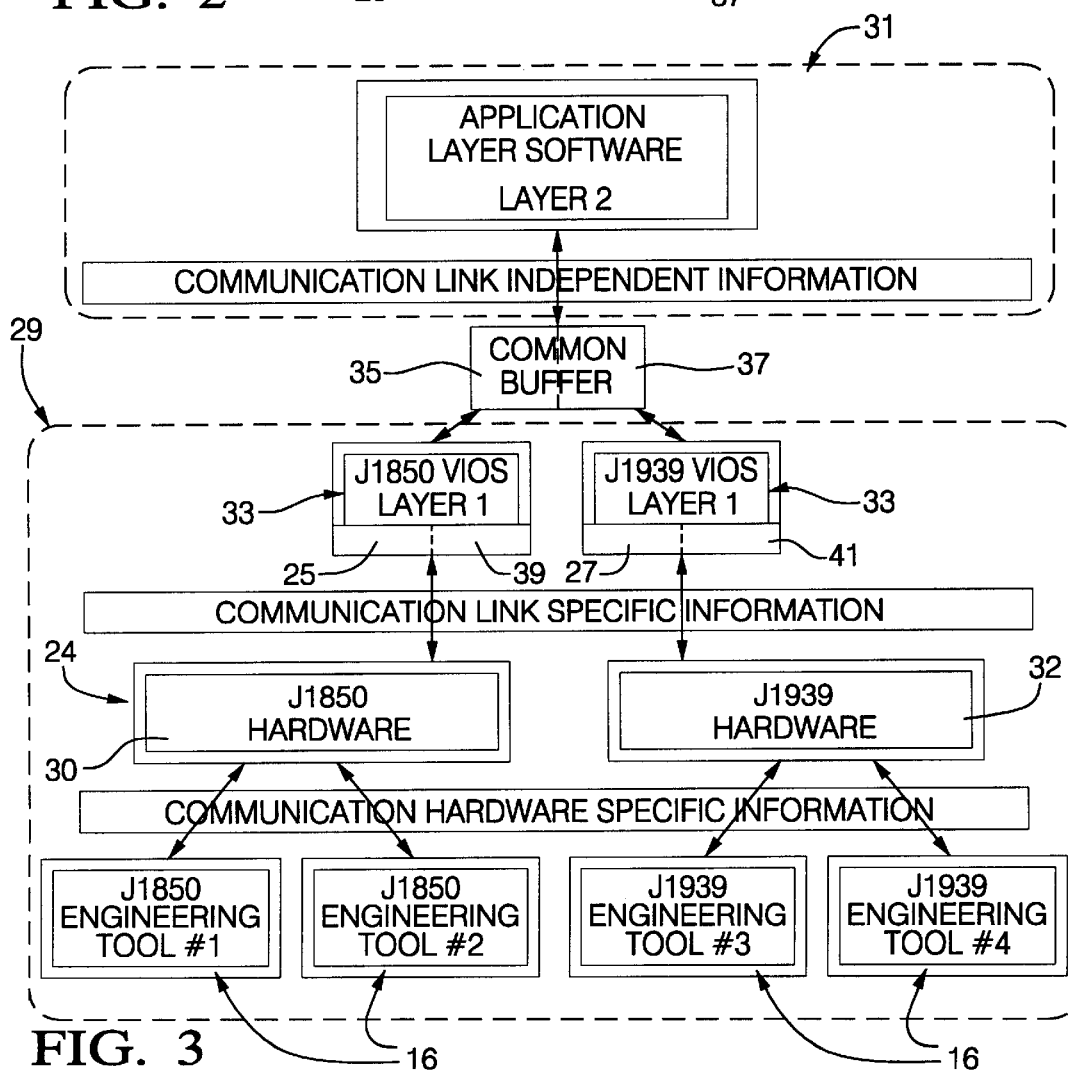
FIG. 3 is a diagrammatic drawing of the communication architecture of the vehicle controller of the present invention.

FIG. 3 is a diagrammatic drawing of the preferred embodiment of the vehicle controller 12 communication architecture of the present invention. The communication interface 24 of the vehicle controller 12 of the present invention includes specific communication hardware such as the J1850 communication interface 30 and the J1939 via communication interface 32 shown in FIG. 3, but is not limited to such. In the communication architecture of the vehicle controller 12, communication specific hardware and software is included in a first datalink/network layer 29. The first layer 29 handles all of the communication link specific message processing for the previously mentioned vehicle networks, including interfacing with the hardware and receiving, transmitting, filtering, and buffering of all messages between the vehicle controller 12 and tools 16. Incoming requests from a tool 16 are reformatted into generic form by a virtual input output system ("VIOS") 33 and made available to a second communication layer 31 for processing using the link specific rebuffers 25, 27, 39 and 41, and the common buffers 39 and 41. The VIOS 33 enables the second communication layer 31 to be communication protocol nonspecific. This is one of the major advantages of the vehicle controller 12 of the present invention since the second layer 31 data is generic and may be used with multiple communication protocols and their associated hardware and software. The first layer 29 formats each response to a communication link in use and handles the transmit process via the communication hardware.

The second communication layer 31 forms a core portion of the method and apparatus of the present invention. As discussed previously, the second layer 31 receives tool 16 requests, via the VIOS 33, located in the first layer 29. The information transferred by the VIOS 33 to the second layer 31 is not specific to a particular communication protocol, allowing the data generated and received by the second layer 31 to be used with multiple communication protocols after it has been processed by the VIOS 33. The second layer 31 processes each incoming tool 16 request and generates a response that is sent back to the first layer 29.

The vehicle controller 12 monitors the communication network 14 for tools 16 that are connected and detached from the communication network 14, via receive buffers 25 and 27. The tools 16 will transmit a diagnostic tool 16 request to the vehicle controller 12 for vehicle data. A tool 16 request to schedule the periodic transmission of a memory location contains request status, tool device ID, message ID of periodic message (MID), memory location of requested data in message, data byte count, and transmit rate.

Figure 4:
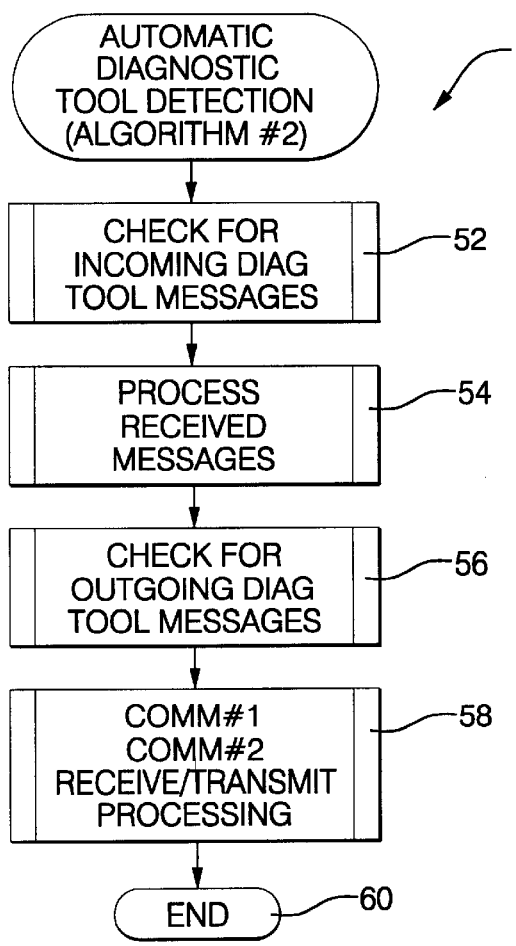
FIGS. 4–8 are flowcharts of the methods/routines used by the vehicle controller of the present invention to transfer data between a remote tool and a vehicle controller.

FIGS. 4–12 are flowcharts of the methods and routines used by the vehicle controller 12 of the present invention to detect and transfer data to a diagnostic tool 16 over the communication network 14 and a second communication network. FIG. 4 is a broad overview of the method/routine 50 of the present invention. Starting at block 52, the routine checks if there are incoming tool 16 messages. Continuing to block 54, the routine processes received tool 16 messages and at block 56 the routine checks for outgoing tool 16 messages. At block 58 the communication links/interfaces transmit and receive data with the routine ending at block 60.

Figure 5:
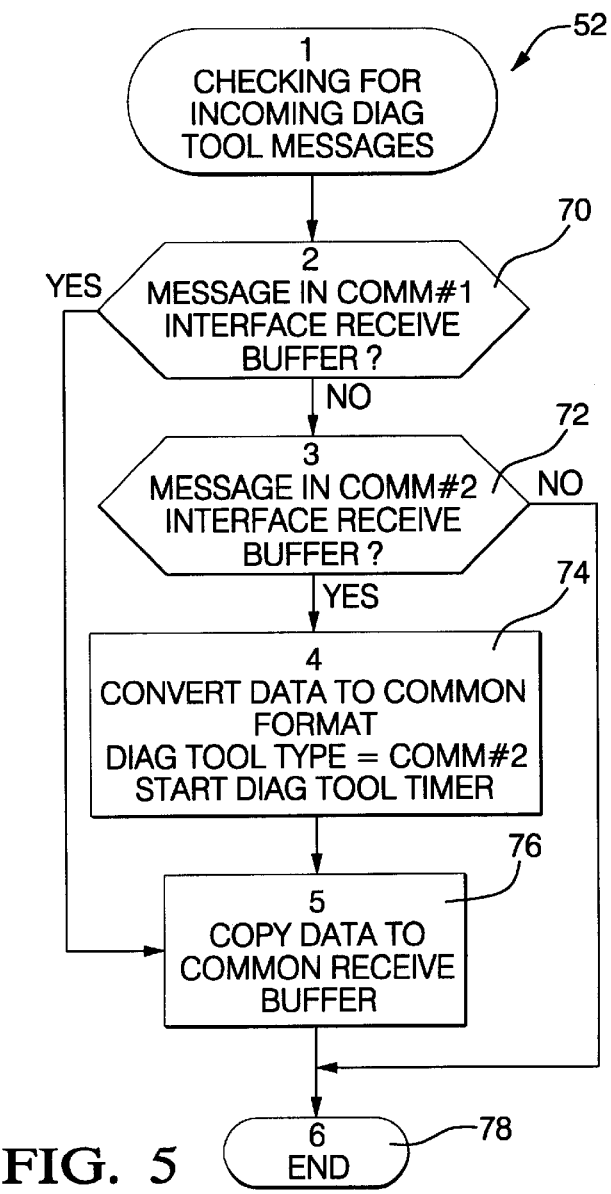

FIG. 5 is a more detailed description of the block 52 of FIG. 4 that checks for incoming diagnostic tool 16 messages. Starting at block 70, the routine determines if there is a message in the first communication link/interface receive buffer 25. If a message is present in the first receive buffer 25, then the data in the message is copied to the common receive buffer 35 for the controller at block 76 and the routine ends at block 78. If no message is present in the first receive buffer 25, then the routine at block 72 determines if there is a message in the second receive buffer 27. If no message is present in the second receive buffer 27, the routine ends at block 78. If a message is present in the second communication link buffer 27, then at block 74 the message data is converted to a common format and a diagnostic tool 16 flag is set to indicate a tool 16 is present on the second communication link. A start diagnostic tool timer is also started in block 74. Continuing to block 76, the message data, now in a common format, is copied to the common receive buffer 35. While two communication networks or links have been described in the present invention, any number of communication networks or links is within the scope of the present invention.

Figure 6:
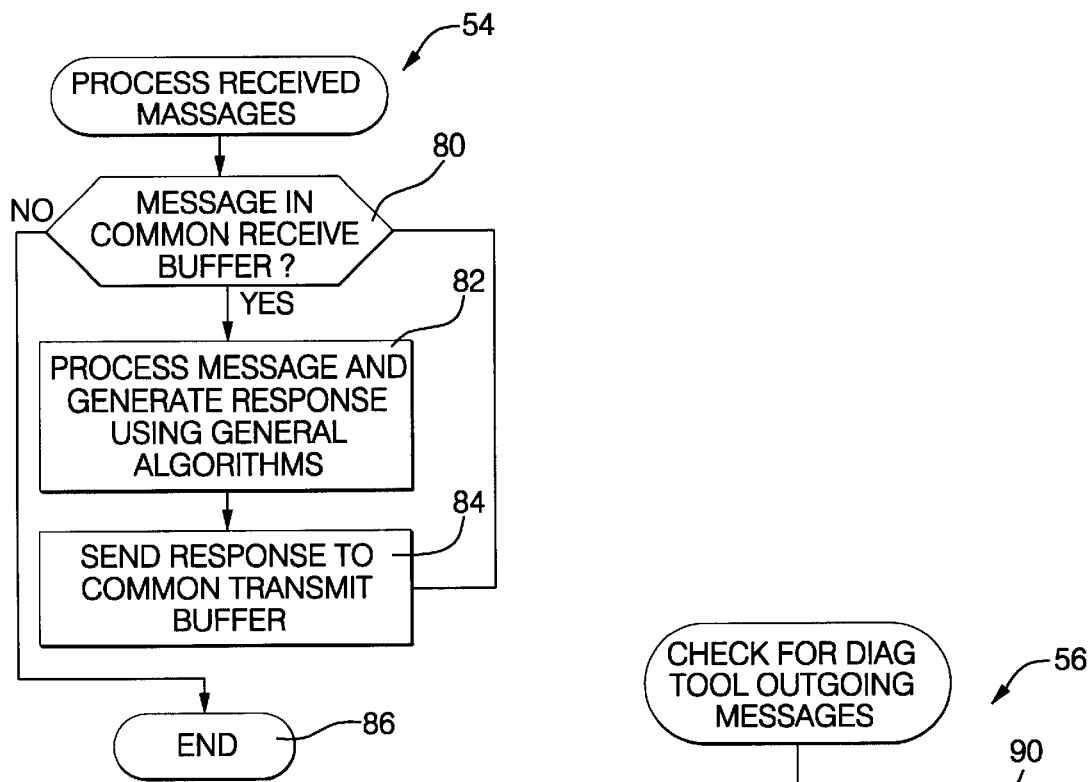

FIG. 6 is a more detailed description of the block 54 of FIG. 4. Starting at block 80, the routine determines if a message is in the common receive buffer 35. If no message is in the common receive buffer 35, the routine ends at block 86. If a message is present in the common receive buffer 35, then the message is processed at block 82 and a response is generated for a specific communications link. The response at block 84 is then sent to a common transmit buffer 37 and the routine returns to block 86 for further execution.

Figure 7:
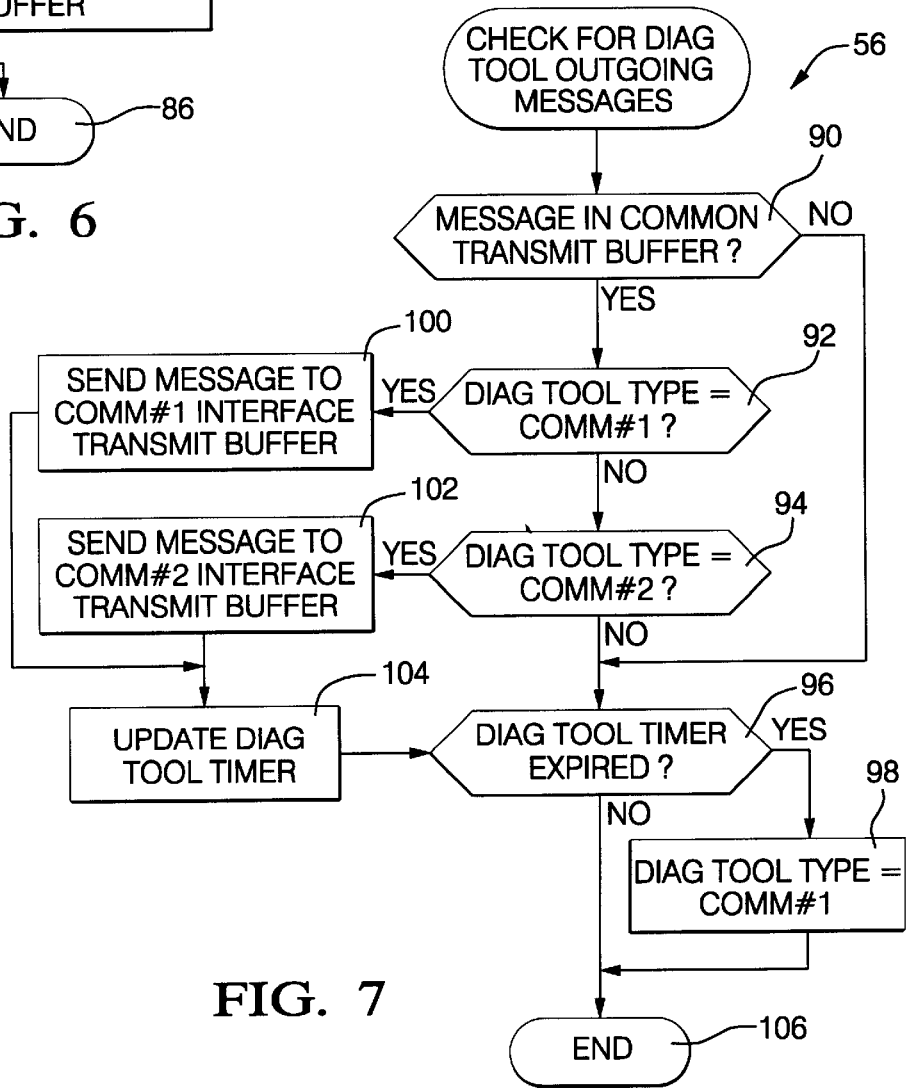

FIG. 7 is a more detailed description of the block 56 of FIG. 4. Starting at block 90, the routine determines if a message is in the common transmit buffer 37. If no message is in the common transmit buffer 37, then the routine at block 96 determines if the diagnostic tool timer has expired. If the diagnostic tool timer has expired, then the diagnostic tool 16 type is set to the default and the program ends at block 106, indicating a tool 16 has been disconnected from the communication network 14. If the diagnostic tool timer has not expired, the program ends at the block 106. Returning to block 90, if there is a message in the common transmit buffer 37, then the routine at block 92 determines if the diagnostic tool 16 is communicating over the first communication link. If the tool 16 is communicating over the first communication link, then at block 100 a message to the first communication interface transmit buffer 39 is sent. The diagnostic tool timer is then updated at block 104 and the routine continues to block 96. If the tool 16 type is not communicating over the first communication link, then the routine at block 94 determines if the tool 16 is communicating over the second communication link. If the tool 16 is communicating over the second communication link, then at block 102 a message is sent to the second communication link transmit buffer 39 and the diagnostic tool timer is updated at block 104 with the routine continuing to block 96. Returning to block 94, if the diagnostic tool timer is not communicating over the second communication link, the routine will continue to block 96.

Figure 8:
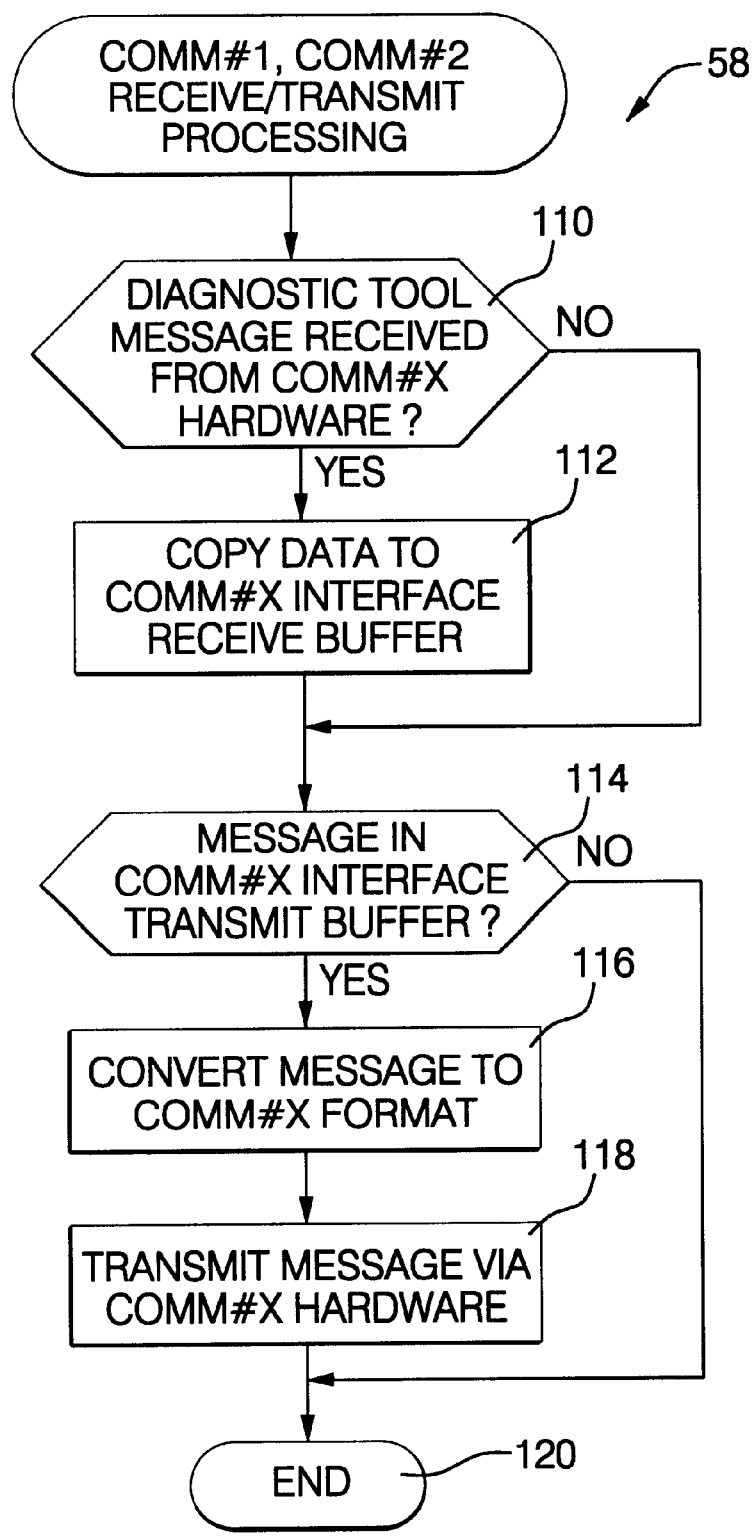

FIG. 8 is a more detailed description of the block 58 of FIG. 4. Starting at block 110, the routine determines if the diagnostic tool 16 message received is from either of the communication links. If yes, the routine continues to block 112 to copy data to the receive buffer 25. If no, the routine continues to block 114 where the routine checks to see if a message is in the transmit buffer 39. If no, the routine ends at block 120. If yes, the routine continues to block 116 where the messages are converted to the desired network format and block 118 where the messages are transmitted via the network hardware. The routine then ends at block 120.

While this invention has been described in terms of some specific embodiments, it will be appreciated that other forms can readily be adapted by one skilled in the art. Accordingly, the scope of this invention is to be considered limited only by the following claims.

What is claimed is:

1. A vehicle controller comprising:

communication hardware for receiving data transmissions from a plurality of diagnostic tools over a plurality of vehicle communication networks, said vehicle communication networks having different communication protocols, the communication hardware including communication protocol specific receive and transit communication buffers;

a virtual input/output system for interpreting the data transmission to the communication hardware to provide communication link independent information to common receive and transmit buffers, wherein the virtual input/output system receives data from the protocol specific receive and transmit buffers;

an applications software layer for receiving the communication link independent information;

wherein upon the connection of at least one diagnostic tool to at least one of the vehicle communication networks, the at least one diagnostic tool will transmit a message over the at least one vehicle communication network, the message stored in the protocol specific receive buffer;

wherein the vehicle controller will record the presence and device ID of the at least one diagnostic tool using the message stored in the protocol specific receive buffer and communicate with the at least one diagnostic tool and transfer vehicle process variables to the at least one diagnostic tool.

2. The vehicle controller of claim 1, wherein the vehicle controller and the at least one diagnostic tool communicate using the J1939 protocol.

3. The vehicle controller of claim 1, wherein the vehicle controller and the at least one diagnostic tool communicate using the CAN protocol.

4. The vehicle controller of claim 1 wherein the vehicle controller and the at least one diagnostic tool communicate using the J1850 protocol.

* * * * *